US011646033B2

(12) United States Patent
Myers et al.

(10) Patent No.: US 11,646,033 B2
(45) Date of Patent: *May 9, 2023

(54) TASK COMPLETION BASED ON SPEECH ANALYSIS

(71) Applicant: Express Scripts Strategic Development, Inc., St. Louis, MO (US)

(72) Inventors: Christopher M. Myers, Dublin, OH (US); Danielle L. Smith, Cedar Park, TX (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/340,290

(22) Filed: Jun. 7, 2021

(65) Prior Publication Data

US 2021/0312924 A1   Oct. 7, 2021

Related U.S. Application Data

(63) Continuation of application No. 16/442,753, filed on Jun. 17, 2019, now Pat. No. 11,031,013.

(51) Int. Cl.
*G10L 15/00* (2013.01)
*G10L 15/26* (2006.01)
(Continued)

(52) U.S. Cl.
CPC ............... *G10L 15/26* (2013.01); *G06N 3/08* (2013.01); *G06N 7/01* (2023.01); *G10L 15/02* (2013.01); *G10L 15/16* (2013.01); *G10L 25/90* (2013.01)

(58) Field of Classification Search
CPC ......... H04M 3/493; G10L 15/16; G10L 15/18
See application file for complete search history.

(56) References Cited

U.S. PATENT DOCUMENTS 7,283,962 B2   10/2007   Meyerhoff
8,149,999 B1    4/2012   Mitby
(Continued)

FOREIGN PATENT DOCUMENTS

WO   2014099818 A2   6/2014
WO   2015017259 A1   2/2015
WO   2018013401 A1   1/2018

*Primary Examiner* — Daniel Abebe
(74) *Attorney, Agent, or Firm* — Schwegman Lundberg & Woessner

(57) ABSTRACT

Method starts with processing, by a processor, audio signal to generate audio caller utterance and transcribed caller utterance. Processor generates identified task based on transcribed caller utterance. Processor samples audio caller utterance to generate samples of audio caller utterance. Processor generates loudness result based on loudness values of samples using loudness neural network associated with identified task. Processor generates pitch result based on pitch values of samples using pitch neural network associated with identified task. Processor generates tone result for each word in transcribed caller utterance using tone neural network associated with identified task. Using task completion probability neural network associated with identified task, processor generates task completion probability result that is based on at least one of: loudness result, pitch result, or tone result. Other embodiments are disclosed herein.

19 Claims, 10 Drawing Sheets

(51) Int. Cl.
  *G10L 15/16*   (2006.01)
  *G10L 15/02*   (2006.01)
  *G10L 25/90*   (2013.01)
  *G06N 3/08*    (2023.01)
  *G06N 7/01*    (2023.01)

(56) References Cited

U.S. PATENT DOCUMENTS

| | | | |
|---|---|---|---|
| 8,463,606 B2 * | 6/2013 | Scott | G10L 25/63 |
| | | | 704/251 |
| 8,787,534 B1 * | 7/2014 | Witt-ehsani | H04M 3/5232 |
| | | | 379/88.01 |
| 9,538,007 B1 * | 1/2017 | Mariappan | G06Q 30/0201 |
| 9,565,310 B2 | 2/2017 | Odinak | |
| 9,742,913 B2 * | 8/2017 | Kumar | H04M 3/42008 |
| 9,961,200 B1 | 5/2018 | Kothuvatiparambil | |
| 10,152,972 B1 | 12/2018 | Thomas | |
| 10,346,863 B2 | 7/2019 | Kelley | |
| 2003/0110039 A1 | 6/2003 | Brown | |
| 2005/0246177 A1 | 11/2005 | Long | |
| 2006/0074685 A1 | 4/2006 | Brown | |
| 2011/0178803 A1 * | 7/2011 | Petrushin | G10L 17/26 |
| | | | 704/E11.001 |
| 2014/0163960 A1 | 6/2014 | Dimitriadis | |
| 2015/0281436 A1 * | 10/2015 | Kumar | H04M 3/5166 |
| | | | 379/68 |
| 2016/0021250 A1 * | 1/2016 | Kumar | H04M 3/5166 |
| | | | 379/88.01 |
| 2016/0358115 A1 * | 12/2016 | Gustafson | G06Q 10/06395 |
| 2017/0310820 A1 | 10/2017 | Kao | |
| 2018/0315427 A1 | 11/2018 | Kwon | |
| 2019/0014213 A1 | 1/2019 | Babjack | |
| 2019/0180175 A1 * | 6/2019 | Meteer | G06N 20/00 |

* cited by examiner

TASK COMPLETION BASED ON SPEECH ANALYSIS

CROSS-REFERENCE TO RELATED APPLICATIONS

This application is a continuation of U.S. application Ser. No. 16/442,753, which was filed Jun. 17, 2019; said patent application Ser. No. 16/442,753 is related to U.S. patent application Ser. No. 16/440,357, filed Jun. 13, 2019, and entitled "RELATIONSHIP DETERMINATION SYSTEM." The entire disclosures of said applications are incorporated by reference herein.

BACKGROUND

Since a user's perception of an organization can be greatly influenced by the customer service that is provided to the user, the organization has interest in ensuring that the user's experience with the customer service is impeccable. While, traditionally, customer service is a face-to-face interaction between the user and an agent that is employed by the organization, in order to increase the ability for the user to access to an agent of the organization, customer service is now accessible via many different means of communication. For example, a user may communicate with a human agent or an automated agent via an audio call (e.g., voice over IP (VoIP), telephone) or via an electronic messaging (e.g., online chat, text messaging).

Whether the user is interacting with a human agent or an automated agent, customer service aims to help the user complete his transaction in the most timely and efficient manner while ensuring that the user's experience with the customer service is enjoyable.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
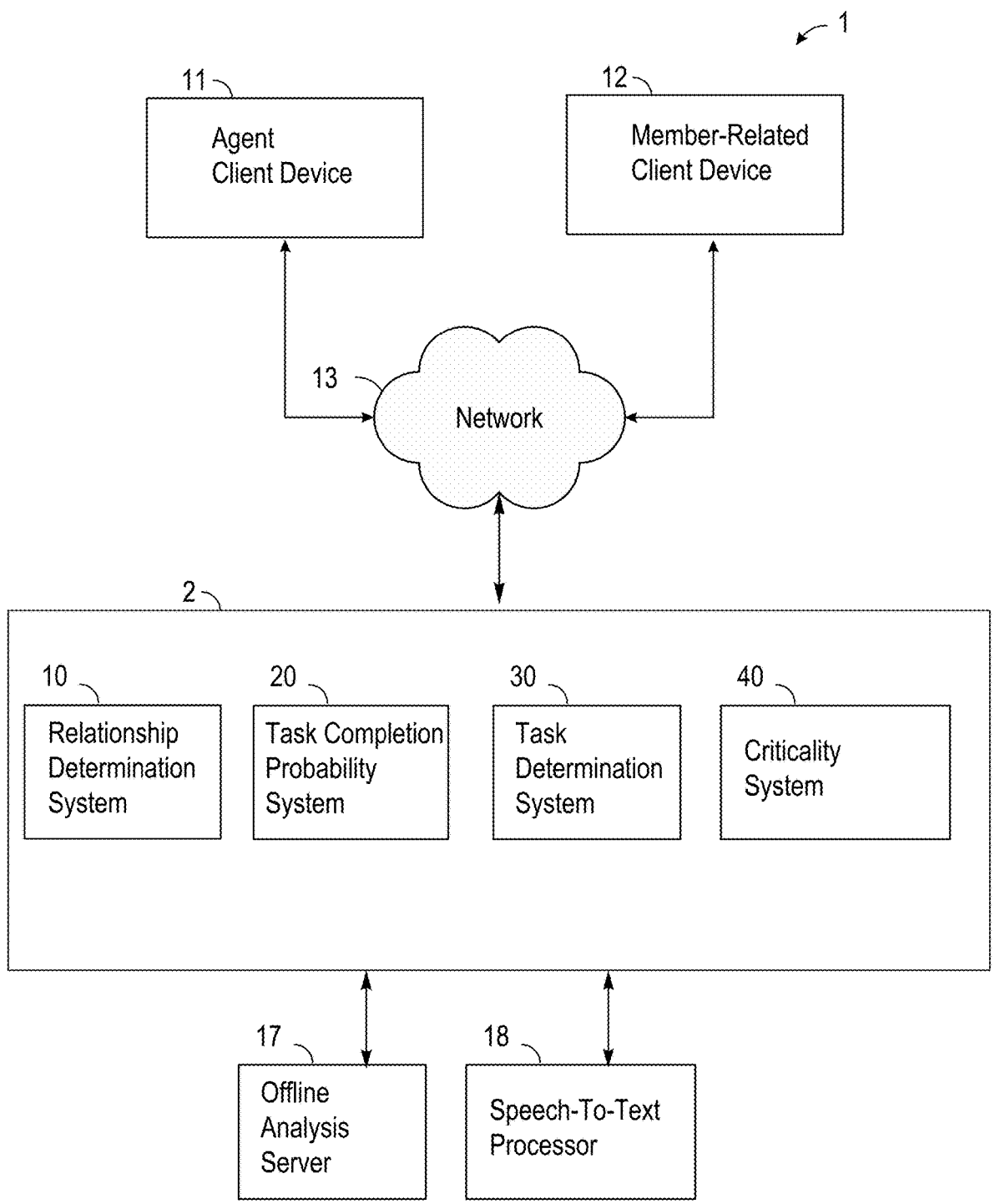
FIG. 1 is a block diagram showing an example system including a task completion probability system according to various exemplary embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of customer service methods and systems. An organization can provide its members with access to customer service via different communication channels including audio calls (e.g., telephone call, VoIP, audio message, etc.) or via electronic messages (e.g., online chat, instant messaging, email, etc.). Optimally, the customer service experience via each of the communication channels should be equally timely, efficient and enjoyable for the member.

A user, e.g., a member or a representative of the member, may also access the customer service of the organization. The user may contact customer service to accomplish a variety of tasks that can greatly vary in complexity. For example, simple tasks include registering for a username and password on the organization's website, or resetting a password associated with the member's online account while more complex tasks include checking an order status, placing an order, requesting information regarding a prescription, or requesting an explanation of benefits associated with an account.

To add further complexity to the servicing the member, the member can also be contacting customer service on behalf of someone else. For example, when the service provided by the organization is medical in nature, customer service call centers can receive calls or electronic messages from a user regarding prescriptions for another patient such as the user's child, spouse, parent, or charge. The user may be the member. The patient (e.g., the user's child, spouse, parent, or charge) may be the member. The user can also be a professional caregiver contacting the customer service on behalf of the patient, who is the member.

A medical group may use the customer service methods and systems as described herein. A medical group may include members, people who benefit from the medical group or are provided with medical treatment by the group.

The medical group can be a medical insurer. The medical group can be a pharmacy benefit manager (PBM). The PBM may store data regarding member usage of prescription drugs. This data may be leveraged in order to provide a member the benefit and may be paid for by a client of the PBM. The clients of the PBM can include employers, group purchasing organizations, and governmental groups. In general, prescription drug and medicine data may be accessed from a PBM database. One or more operations may be performed on the prescription drug and medicine data to generate success data between a member and a user contacting the medical group system as described herein. The user contacting the medical group system can include a person related to the patient, a guardian of the patient, a caregiver of the patient, a medical care provider of the patient. In some cases, the user is also a member and is contacting the medical group on behalf of another member.

The tasks that the user wishes to complete are also associated with a different level of criticality that affects the interaction between the member and the agent. For example, a user (e.g., the member) may be calling about his medication that he has not yet received or a user may be calling on behalf of a member who has not yet received their prescription medication. The criticality of the call would depend on the type of medication he is waiting on. The type of medication he is waiting on would be stored in the database of the PBM.

Accordingly, to further improve the functionality of customer service software and systems, embodiment of the present disclosure determines the probability that a task is completed based on an analysis of the communication between the user and the agent. The probability that the task is completed can be based on, for example, the task to be completed for the member, the criticality of the task, the relationship between the user and the person on behalf of which the user is contacting customer service, the tone of the user's speech, the pitch of user's speech, the loudness of the user's speech, etc.

FIG. 1 is a block diagram showing an example system 1 according to various exemplary embodiments. The system 1 can be a customer service system that includes a customer service server system 2, an agent client device 11, and a member-related client device 12 that are communicatively coupled over a network 13 (e.g., Internet, telephony network).

The agent client device 11 and the member-related client device 12 can be communicatively coupled via an audio call (e.g., VoIP, Public Switched Telephone Network, cellular communication network, etc.) or via electronic messages (e.g., online chat, instant messaging, text messaging, email, and the like). In another embodiment, the agent client device 11 and the member-related client device 12 are communicatively coupled via a telephone call using a telephony network 13. While FIG. 1 illustrates a single agent client device 11 and a single member-related client device 12, it is understood that a plurality of agent client devices 11 and a plurality of member-related client devices 12 can be included in the system 1 in other embodiments. As used herein, the term "client device" may refer to any machine that interfaces to a communications network (such as network 13) to obtain resources from one or more server systems or other client devices. A client device may be, but is not limited to, a mobile phone, desktop computer, laptop, portable digital assistants (PDAs), smart phones, a wearable device (e.g., a smart watch), tablets, ultrabooks, netbooks, laptops, multi-processor systems, microprocessor-based or programmable consumer electronics, game consoles, set-top boxes, or any other communication device that a user may use to access a network. The member-related client device 12 can include a microphone and speaker on a mobile electronic device, a telephone, or a self-service kiosk, e.g., at a pharmacy, a clinic, a doctor's office, a mobile relief center, and the like.

The network 13 may include, or operate in conjunction with, an ad hoc network, an intranet, an extranet, a virtual private network (VPN), a local area network (LAN), a wireless network, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In the example shown in FIG. 1, a user using the member-related client device 12 can establish a communication session with an agent associated with the agent client device 11. The agent can be a human agent or an automated agent, e.g., on behalf of an organization. The automated agent can be associated with a medical group that includes the member. The automated agent can be an interactive voice response (IVR), a virtual online assistant, or a chatbot. During a communication session between the user and the agent, the customer service server system 2 identifies the member using initial context data (e.g., the phone number the member is calling from, the website login information inputted, automatic number identification (ANI), etc.) and retrieves the data on the member (e.g., member account information, name, address, insurance information, information on spouse and dependents, etc.).

The customer service server system 2 in FIG. 1 includes a relationship determination system 10, a task completion probability system 20, a task determination system 30, and a criticality system 40. The customer service server system 2 can further include elements described with respect to FIGS. 9 and 10, such as a processor and memory, having instructions stored thereon, that when executed by the processor, causes the processor to control the functions of the customer service server system 2.

As shown in FIG. 1, the system 1 can also include an offline analysis server 17 and a speech-to-text processor 18 that are communicatively coupled to each other and to the customer service server system 2. In one embodiment, the offline analysis server 17 and the speech-to-text processor 18 is included in the customer service server system 2 and communicatively coupled to the relationship determination system 10, the task completion probability system 20, the task determination system 30, and the criticality system 40.

In the customer service server system 2 of FIG. 1, the relationship determination system 10 can analyze utterances or electronic messages from the communication session to build and transmit relationship data to the agent client device 11. The relationship data identifies the relationship between the user (who can be the member or the person on behalf of which the member is contacting customer service) and the member. The relationship determination system 10 can include an Application Program Interface (API) server, a relationship determination application server that can create events based on the relationship data generated, and a database that stores data processed by the relationship determination application server to build and transmit the relationship data. In one embodiment, the event includes the pertinent information about the type of relationship that is detected based on the relationship data. For example, the pertinent information can be "parent of member (identification number) 123 and member 123 is a minor". In one embodiment, a plurality of events can be generated because a user can be calling about several different members during a given call. A separate event can be generated as the context changes. For example, a user can be a user who is calling to fill a prescription for his wife and then his daughter. In this example, two separate events can be generated: a first event for husband and wife and a second event for father and daughter.

The relationship determination system 10 receives data (e.g., strings that are on the transcribed or digitized utterances or electronic messages) and transmits data (e.g., relationship data) to, for example, the agent client device 11 and the task completion probability system 20. Strings that are on the transcribed or digitized utterances or electronic messages can be an array data structure of words comprising phrases of input from a user. For example, a string can be an array of characters that contains the data from the automated transcription. The string can include one or more words that was provided by the user in response to a query. The string can also include a series of singularly spoken letters or number. For example, the user may be providing a member identification number or a prescription number. The string can also include a combination of words and singularly spoken letters or numbers. To generate the strings, the speech-to-text processor 18 can implement Fast Fourier Transforms (FFTs) or Neural Networks such as Long-Short Term Memory Neural Networks (LSTM). The relationship determination system 10 can receive and transmit data in real-time. In one embodiment, the relationship determination system 10 receives data (e.g., strings that are on the transcribed/digitized utterances or electronic messages) from the task completion probability system 20 that is performing offline analysis of call recordings, audio strings, or chat transcripts between the member-related client device 12 and the agent client device 11. In one embodiment, the offline analysis server 17 is included in the customer service server system 2 and is performing the offline analysis. In another embodiment, the offline analysis server 17 is separate from customer service server system 2 and is performing the offline analysis. In one embodiment, the string that is an electronic message can be a portion of an online chat exchanged between the agent and the member that is received by the processor in real time. In this embodiment, the processor generates strings by processing online chat to parse and separate the different portions of the online chat.

Digitized utterances can be digitized audio files of user audio during the communication session. In this embodiment, the relationship determination system 10 can transmit data (e.g., relationship data) to the task completion probability system 20 offline. When the communication session between the agent client device 11 and the member-related client device 12 is an audio communication, the audio communication is processed in the customer service server system 2 (e.g., the speech-to-text processor 18) to convert each utterance from speech to text to generate a string that is received by the relationship determination system 10. In this embodiment, the audio communication is processed in the customer service server system 2 to generate each user utterance to a user audio string.

The database of the relationship determination system 10 can include membership data that includes general membership data related to the organization, rules implemented by the organization for membership, member authentication requirements, etc. The membership data can be for example data required for authentication, specific call routing requirements, information on member benefits, information on the member's plan, etc.

The database of the relationship determination system 10 can also include personal data related to all the members associated with the organization providing the customer service. The personal data can also be related to all other patients associated with the organization via the members. The database of the relationship determination system 10 can also include a personal graph or table that stores information regarding relationships and associations between members and other patients.

The database of the relationship determination system 10 can also store caregiver data including rules applied by the organization to authenticate caregivers, identification data for each of the caregivers in the system and the patients each caregiver is associated with, etc. Caregiver data can be, for example, types of permissible data used to authenticate a person as a caregiver such as pin numbers, member numbers, etc. Caregiver data can also set the types of data to be obtained from the user to validate the caregiver relationship.

The database of the relationship determination system 10 can store communication session data which is data related to a communication session between the agent client device 11 and the member-related client device 12. Communication session data can be, for example, Automatic Number Identification (ANI), Dialed Number Identification Service (DNIS), Membership Information provided (e.g., Prescription number, Membership number), authentication status (e.g., partial or complete). Communication session data can also be an indication of whether a particular member or members have been authenticated, whether a member was directly authenticated as a caregiver, etc. . . . . Communication session data can also be, for example, transcribed text of full utterances provided by the user.

The database of the relationship determination system 10 can also store initial context data related to the member (e.g., user or patient) that has established a communication session with the agent client device 11. Initial context data can include, for example, website login information, automatic number identifier, telephone number. Initial context data can also include member account information such as name, address, employer, medication, insurance information, preferred pharmacy, and information on member's spouse or dependents.

In the customer service server system 2 of FIG. 1, the task determination system 30 processes information during the communication session between a user and an agent to generate an identified task. The identified task is the task that the user is wanting to complete during the communication session. The task can be related to the member that is the user, the user's spouse, child, charge, etc. Examples of tasks include, for example, checking on an order status, refilling a prescription, asking questions about a claim, paying a bill, etc. The task determination system 30 may include an API server, task determination application server that generates the identified task, and a database to store communication session information. The communication session information includes, for example, initial context information related to the member (e.g., user or patient) such as website login information, automatic number identifier, telephone number, as well as member account information such as name, address, employer, medication, insurance information, preferred pharmacy, and information on member's spouse or dependents.

The task determination system 30 receives data (e.g., strings included in the transcribed utterances, recorded utterances, or electronic messages) and transmits data (e.g., identified task) to, for example, the agent client device 11 and the task completion probability system 20. The task determination system 30 can receive and transmit data in real-time. In one embodiment, the task determination system 30 receives data (e.g., strings that are on the transcribed utterances or electronic messages) from the task completion probability system 20 that is performing offline analysis of call recordings or chat transcripts between the member-related client device 12 and the agent client device 11. In this embodiment, the task determination system 30 can transmit data (e.g., relationship data) to the task completion probability system 20 offline. In an example embodiment, offline can be when the user (e.g., using the member-related client device 12) is not engaged with the customer service server system 2. Offline can include a different communication path or session than the communication between the client devices 11, 12 or to the customer service system 2. When the communication session between the agent client device 11 and the member-related client device 12 is an audio communication, the audio communication is processed in the customer service server system 2 (e.g., speech-to-text processor 18) to convert each utterance from speech to text to generate a string that is received by the task determination system 30.

In the customer service server system 2 of FIG. 1, the criticality system 40 processes information during the communication session between a user using a member-related client device 12 and an agent using agent client device 11 to generate a criticality value that indicates a level of criticality associated with the communication session. The criticality value may indicate a low or a high level of criticality. The criticality value can be a binary value (e.g., low or high) or can be a range of values. The criticality value can also be a value (e.g., from 0 to 1) that indicates the criticality of a condition that is the subject of the communication session. For example, the criticality value can indicate the level of illness of a patient. A patient undergoing chemotherapy or gene therapy may be associated with a criticality value approaching high (or approaching 1). A patient who is a transplant patient receiving maintenance medication may be associated with a criticality value of 0.5 (e.g., medium level of criticality) while a patient who is on statins which are drugs that lower cholesterol levels may be associated with a criticality value that is low (or approaching 0). The criticality system 40 can include an API server, criticality application server that generates the criticality value, and a database to store communication session information. The communication session information includes, for example, initial context information related to the member such as website login information, automatic number identifier, telephone number, as well as member account information such as name, address, employer, medication, insurance information, preferred pharmacy, and information on member's spouse or dependents. The criticality system 40 can generate a criticality value based on the communication session information.

The criticality system 40 receives data (e.g., strings included in the transcribed utterances, the audio utterances or the electronic messages) and transmits data (e.g., criticality value) to, for example, the agent client device 11 and the task completion probability system 20. The criticality system 40 can receive and transmit data in real-time. Real-time can be during a communication session between the client devices 11, 12. In one embodiment, the criticality system 40 receives data (e.g., strings included in the audio utterances, the transcribed utterances or the electronic messages) from the task completion probability system 20 that is performing offline analysis of call recordings or chat transcripts between the member-related client device 12 and the agent client device 11. In this embodiment, the criticality system 40 can transmit data (e.g., criticality value) to the task completion probability system 20 offline. When the communication session between the agent client device 11 and the member-related client device 12 is an audio communication, the audio communication is processed in the customer service server system 2 (e.g., speech-to-text processor 18) to convert each utterance from speech-to-text to generate a text string that is received by the criticality system 40 or to covert each utterance to an audio string that is received by the criticality system 40.

Figure 2:
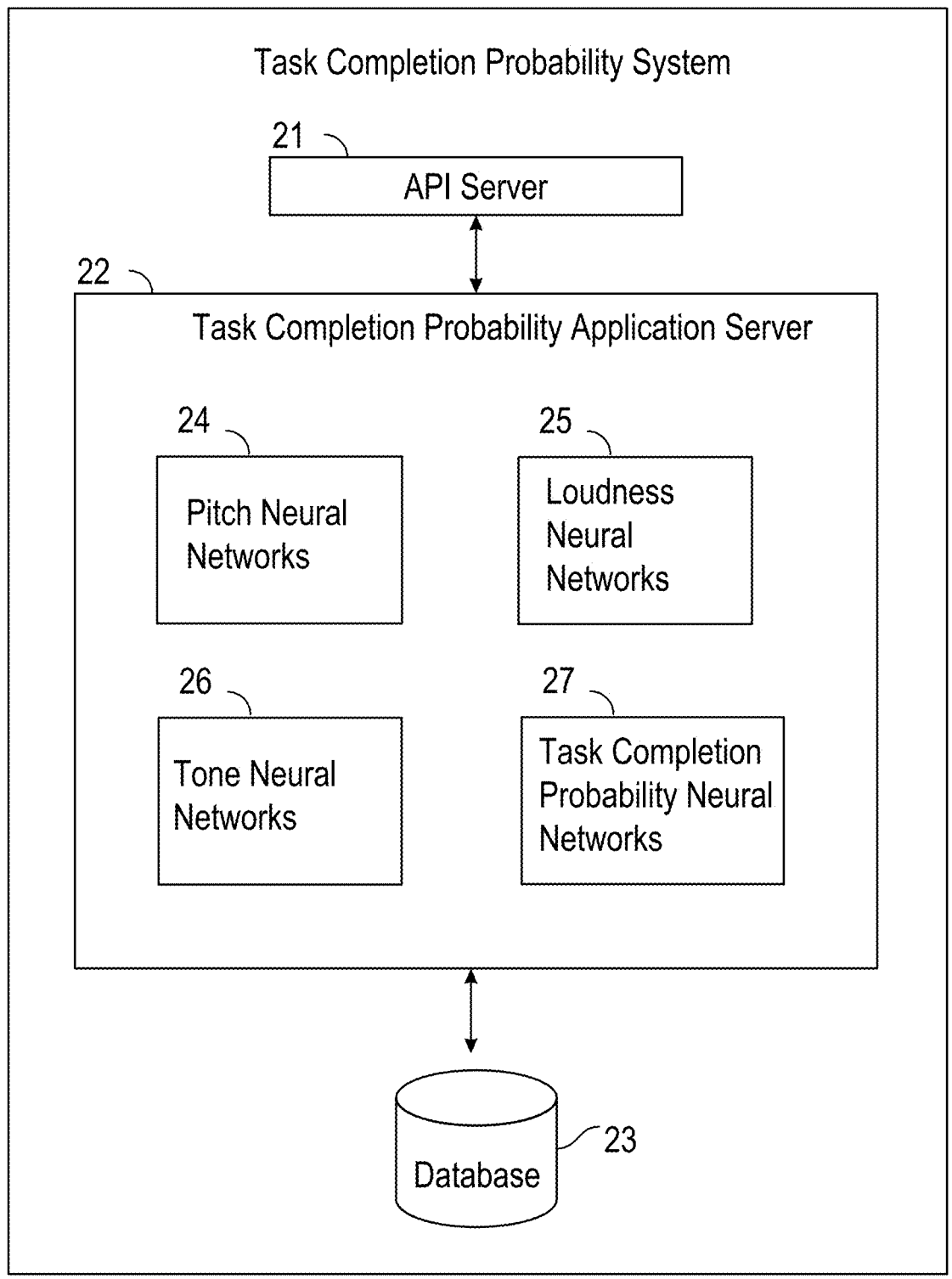
FIG. 2 is block diagram illustrating further details regarding the task completion probability system, according to exemplary embodiments.

In the customer service server system 2 of FIG. 1, the task completion probability system 20 performs speech analysis to process the information during the communication session between a user and an agent and to generate a task completion probability. FIG. 2 is block diagram illustrating further details regarding the task completion probability system 20, according to exemplary embodiments. The task completion probability system 20 includes an API server 21 that is coupled to and provides a programmatic interface to a task completion probability application server 22. For example, the task completion probability application server 22, using the API server 21, receive real-time access to the communication session between the user and the agent (e.g., between devices 11, 12). The communication session can include, for example, an interactive voice response (IVR) or a voice call with an agent that can be a human agent or an automated agent. The task completion probability application server 22 may also use a batch interface to receive call recordings and analytics of the communication session from an external system for offline processing and training of the task completion probability application server 22.

The task completion probability application server 22 can further include speech-to-text processor (not shown) that converts or transcribes an audio signal (e.g., the interactive voice response (IVR), the voice call, or the call recordings) into a transcribed audio signal, identifies separate parties in the audio signal and generates start and end times for each utterance included in the audio signal. The separate parties in the audio signal include for example the caller (e.g., user or member) and the agent. The task completion probability application server 22 can remove agent utterances from the utterances included in the audio signal and separate the audio caller utterance from the audio signal using the start and end times for each of the utterances. The task completion probability application server 22 can then select the transcribed caller utterance from the transcribed audio signal based on the audio caller utterance. The task completion probability application server 22 can select the audio caller utterances from the audio signal.

As shown in FIG. 2, the task completion probability application server 22 includes a plurality of neural networks including pitch neural networks 24, loudness neural networks 25, tone neural networks 26, and task completion probability neural networks 27. In one embodiment, the task completion probability application server 22 includes a plurality of neural networks per task. For example, the pitch neural networks 24 can include one neural network per task, the loudness neural networks 25 can include one neural network per task, the tone neural networks 26 can include one neural network per task, and the task completion probability neural networks 27 can include one neural network per task. The task completion probability application server 22 is communicatively coupled to the database 23, in which is stored data processed by the task completion probability application server 22 to build and transmit the task completion probability, as further described herein. In one embodiment, rather than including neural networks, the task completion probability application server 22 includes a memory that stores instructions, when executed by a processor, causes processor to perform the operations of the pitch neural networks 24, loudness neural networks 25, tone neural networks 26, and task completion probability neural networks 27.

Figure 3:
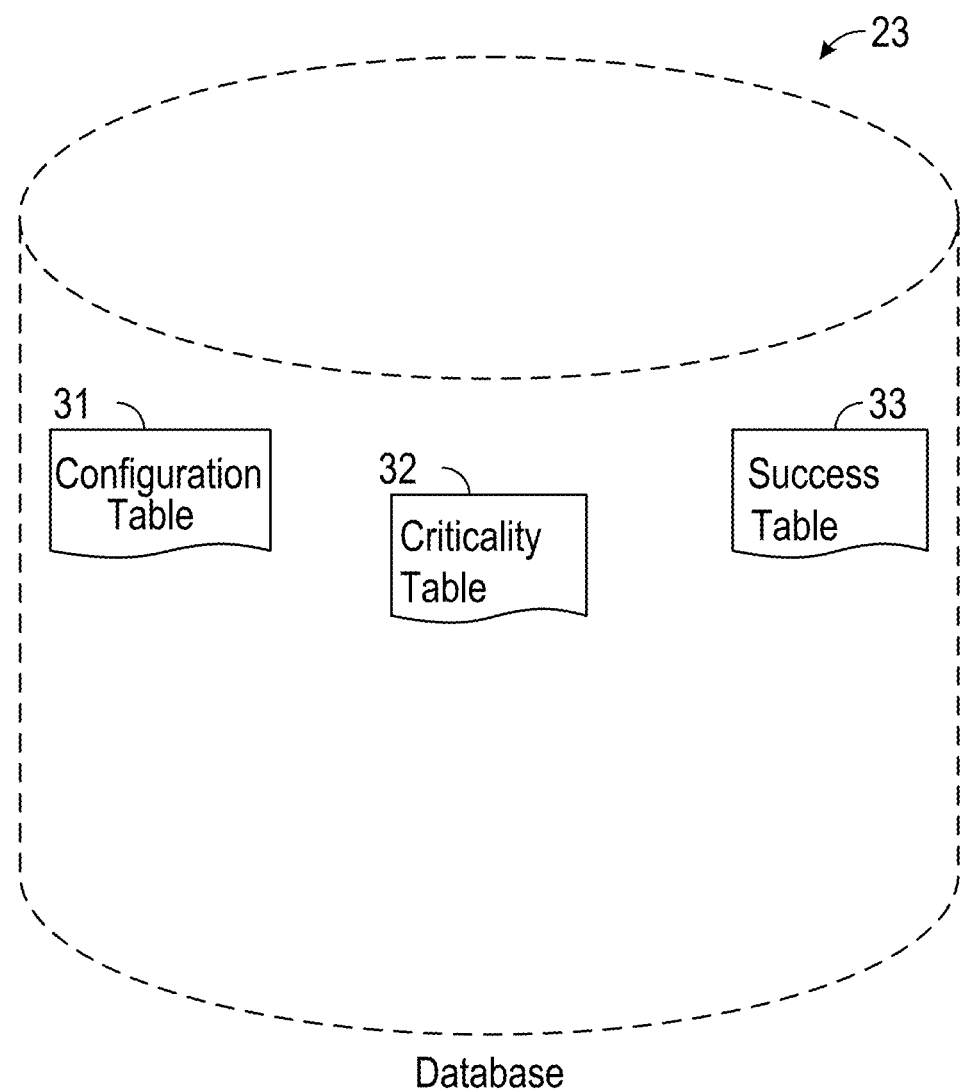
FIG. 3 is a schematic diagram illustrating data which may be stored in the database of the task completion probability system, according to various exemplary embodiments.

FIG. 3 is a schematic diagram illustrating data that is stored in the database 23 of the task completion probability system 20, according to certain exemplary embodiments. While the content of the database 23 is shown to comprise a number of tables, the data could be stored in other types of data structures (e.g., as an object-oriented database). The database 23 includes a configuration table 31, a criticality table 32, and a success table 33.

The configuration table 31 stores configuration values used to compute success values (e.g., $Success_{Total}$) associated with each of the tasks. Configuration values include average handle times for each task (e.g., $AHT_{Task}$). Configuration values also include, for each task, the weight associated with the successful completion of the task (e.g., $Weight_{Task}$), the weight associated with the handling time of the task (e.g., $Weight_{HT}$), the weight associated with a call survey score (e.g., $Weight_{CallSurvey}$), etc.

The criticality table 32 stores the criticality value for each task in association with the member. For example, the criticality value can be a range (e.g., between 0 and 1) that indicates the level of criticality for the task to be completed for this member (e.g., from not critical to critical).

The success table 33 stores the success value for each task that is computed during the training of the task completion probability system 20. For example, the success value (e.g., $Success_{Total}$) can be based on whether the task was successfully completed (e.g., $Success_{Task}$), the handle time of the task (e.g., $HT_{Task}$), and the call survey score received for the call during which the task was handled. In some embodiments, the call survey score is first normalized (e.g., $NormalizedScore_{CallSurvey}$) to ensure that when no call survey score is received the normalized call survey score is set to neutral. For example, the call survey score can be normalized between −1 and 1 and the neutral score is 0 such that the values under 0 are associated with unfavorable results while values over 0 will be associated with favorable results. The success value (e.g., $Success_{Total}$) can also be based on the weight associated with the successful completion of the task (e.g., $Weight_{Task}$), the weight associated with the handling time of the task (e.g., $Weight_{HT}$), and the weight associated with a call survey score (e.g., $Weight_{CallSurvey}$). For example, the success value (e.g., $Success_{Total}$) can be obtained using the following equation:

$$Success_{Total} = \\ (Weight_{Task} * Success_{Task}) + \left(Weight_{HT} * \left(\frac{AHT_{Task} - HT_{Task}}{AHT_{Task}}\right)\right) + \\ (Weight_{CallSurvey} * NormalizedScore_{CallSurvey})$$

Although the following flow diagrams may describe the operations as a sequential process, many of the operations can be performed in parallel or concurrently. In addition, the order of the operations may be re-arranged. A process is terminated when its operations are completed. A process may correspond to a method, a procedure, a series of tasks, etc. The steps of methods may be performed in whole or in part, may be performed in conjunction with some or all of the steps in other methods, and may be performed by any number of different systems, such as the systems described in FIG. 1 and/or FIG. 10.

Figure 4:
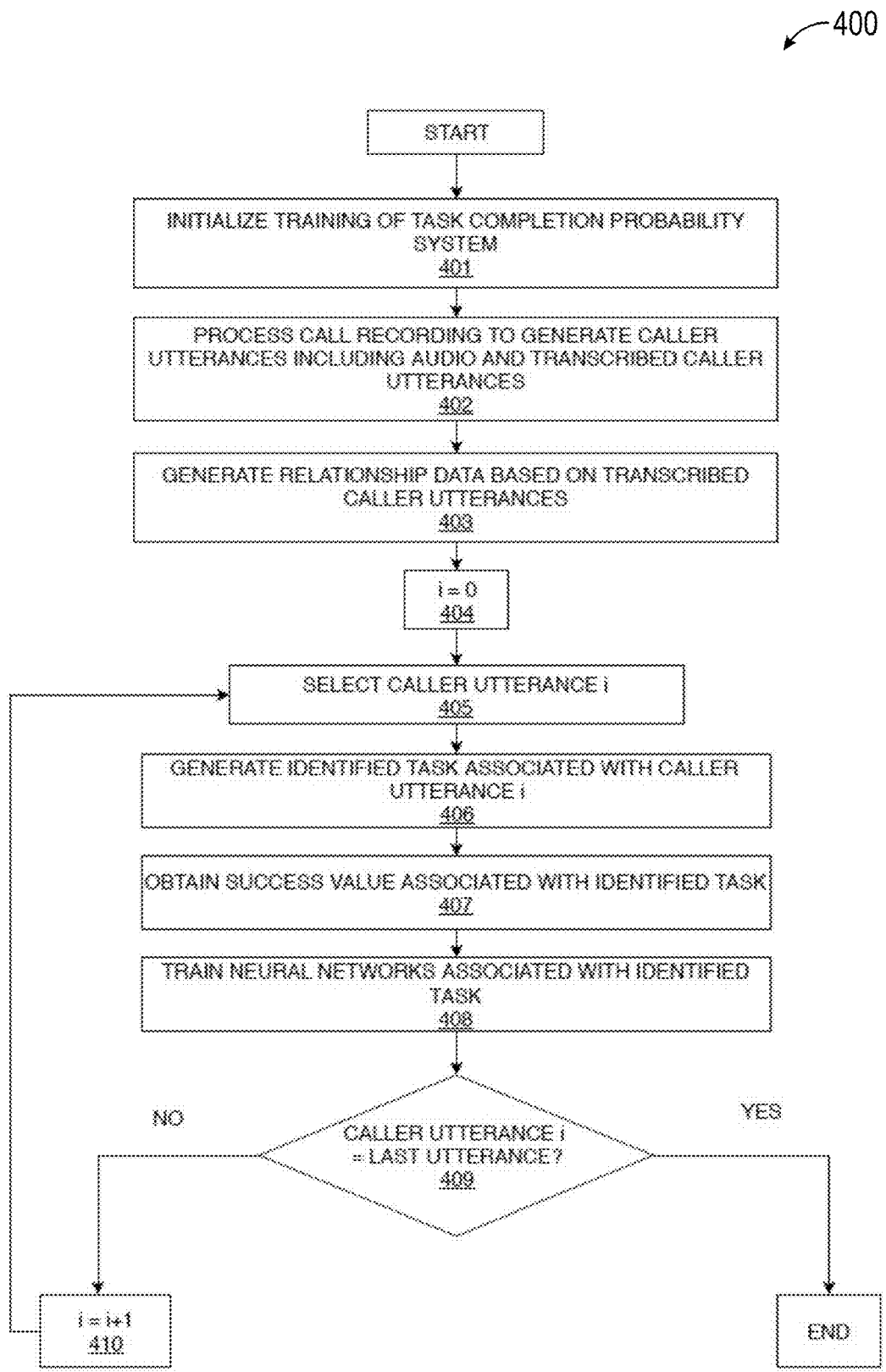
FIG. 4 is a flow diagram of an exemplary method of training the task completion probability system to determine a task completion probability based on speech analysis according to various aspects of the disclosure.

FIG. 4 is a flow diagram of an exemplary method 400 of training the task completion probability system to determine a task completion probability based on speech analysis according to various aspects of the disclosure. The method 400 can be performed by the customer service server system 2 in FIG. 1. In one embodiment, a processor included in the customer service server system 2 performs the method 400 or causes the customer service server system 2 to perform the method 400.

Method 400 starts, at operation 401, the processor initializes the training of the task completion probability system 20. In some embodiments, the processor initializes the training of the task completion probability application server 22. Further details on the initialization in operation 401 is discussed with reference to FIG. 5.

At operation 402, the processor (or circuitry dedicated to performing instructed tasks) processes a call recording to generate to generate caller utterances including audio utterances and transcribed caller utterances. In one embodiment, the call recording is a recorded communication session between a caller (e.g., a user or a member) on a member-related client device 12 and an agent on an agent client device 11 used for system training purposes. Further details on the processing in operation 402 is discussed with reference to FIG. 6.

At operation 403, the processor generates the relationship data based on transcribed caller utterances, which can be strings. Relationship data includes one or more potential relationships between the caller and the patient that is the subject of the transcribed caller utterance. The caller can be the member in some examples. The patient can be the member in some examples. When the caller is communicating with the agent on behalf of himself, the processor can generate the relationship data that includes "self." When the caller is communicating with the agent on behalf of another person (e.g., a patient member), the relationship data indicates the relationship between the member and the patient in order further facilitate in assisting the member. For example, the relationship types include a parent-child relationship in which the caller is the and a parent and the patient is the member's child; child-parent relationship in which the caller is a caretaker child and the patient is the member and caller's parent; spousal relationship in which the caller and the patient are spouses, either of which can be a member; and professional caregiver relationship in which the caller is a professional caregiver for the patient member. Each of the relationship types is allocated one neural network that is trained offline to assess whether a caller utterance indicates the relationship type to which it is allocated.

In some embodiments, the relationship data is generated for a plurality of transcribed caller utterances (e.g., at least a portion of the call recording). The processor can cause the relationship determination system 10 to perform the operation 403 to generate the relationship data. For example, the relationship determination system 10 can process the transcribed caller utterances using neural networks to generate relationship values that are associated with relationship types. Each of the neural networks used by the relationship determination system can be Long Short-Term Memory (LSTM) neural networks. In an example embodiment, the neural networks can include a Gated Recurrent Unit (GRU) neural network. The relationship determination system 10 can then generate weight values using initial context data of the member for each of the relationship types. The initial context data can include, for example, a website login information, an automatic number identifier (AIN), and telephone number. The initial context data can also include, for example, member account information such as name, address, employer, medication, insurance information, preferred pharmacy, and information on member's spouse or dependents. Using the relationship values and the weight values, the relationship determination system 10 can generate probability values for the relationship types. The probability values for the relationship types are used to determine the potential relationships to be included in the relationship data.

In order to process each of the caller utterances, at operation 404, the processor sets an index i to 0 and at operation 405, the processor selects the caller utterance i. At operation 406, the processor generates an identified task associated with the caller utterance i. In one embodiment, the processor causes the task determination system 30 to perform the operation 406 and to generate the identified task. The task determination system 30 can process the caller utterance i using neural networks to determine the task that the caller is requesting. The caller utterance i can be a transcribed utterance in an example embodiment. The caller utterance i can be an audio utterance or string in an example embodiment. Each of the tasks available on the customer service system 2 can be assigned to a specific neural network. The neural networks used by the task determining system 30 can be a Convolutional Neural Network (CNN).

At operation 407, the processor obtains a success value associated with the identified task (e.g., $Success_{Total}$). For example, the processor can retrieve the success value (e.g., $Success_{Total}$) stored in the success table 33 of the database 23 in association with the identified task.

At operation 408, the processor trains neural networks associated with the identified task. Each of the tasks available on the customer service system 2 can be associated with a plurality of neural networks. For example, the task of resetting the password on the member's online account can be associated with a loudness neural network, a pitch neural network, a tone neural network and a task completion probability neural network. The loudness neural network, the pitch neural network, and the tone neural network can be LSTM neural networks. The task completion probability neural network can be a CNN. Further details on the training of the neural networks in operation 408 is discussed with reference to FIG. 7.

At operation 409, the processor determines whether the caller utterance i is the last caller utterance in the call recording. If the caller utterance i is not the last caller utterance, at operation 410, the processor increases the value of i by 1 and sets the index i to i+1 (e.g., i=i+1) and the method 400 proceeds to operation 405. If the caller utterance i is the last caller utterance, the processor ends the method 400. It is understood that the processor can repeat the method 400 if a plurality of calls recordings are received.

Figure 5:
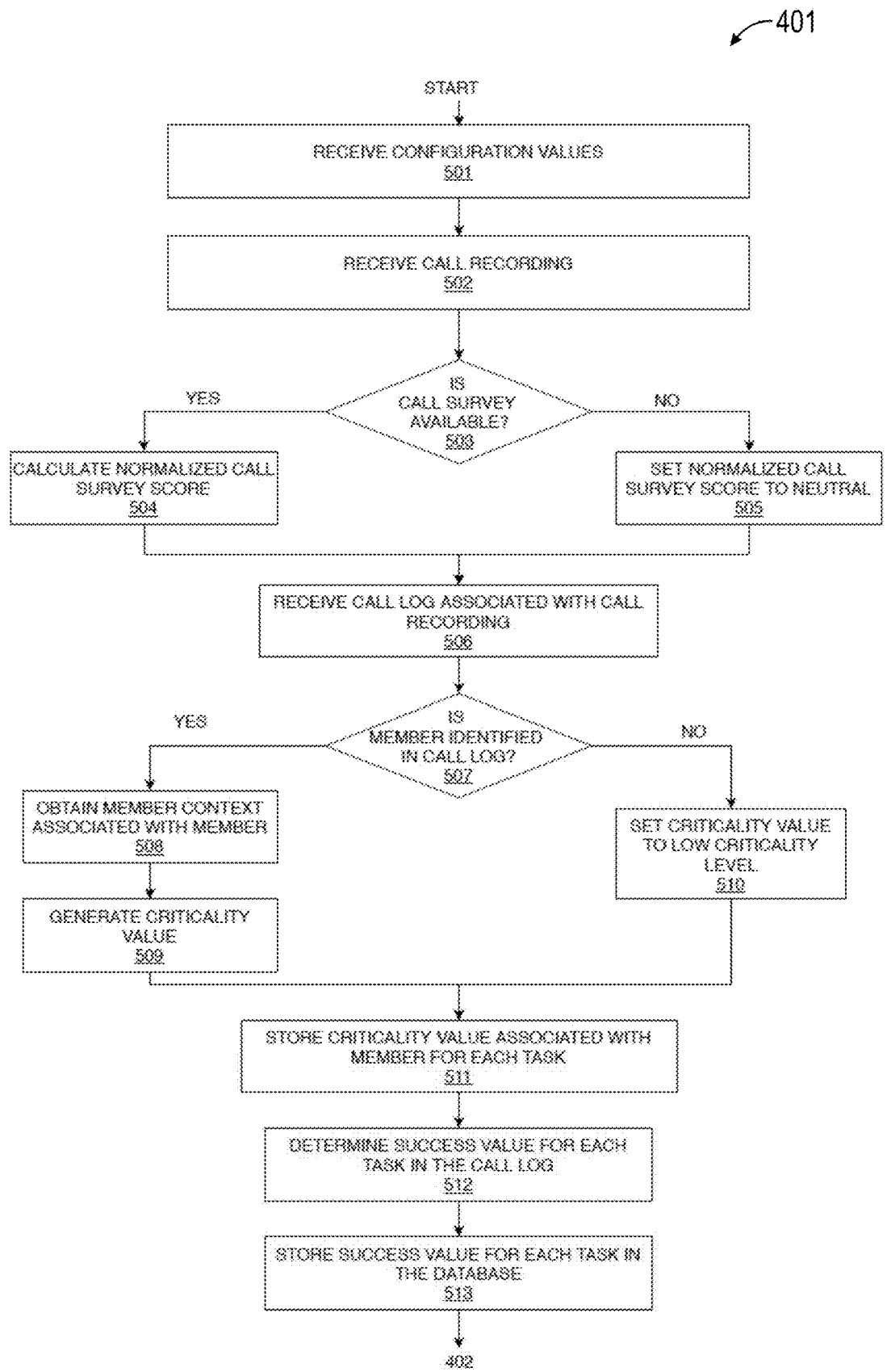
FIG. 5 is a flow diagram of an exemplary method of initiating the training (operation 401) in the method of training the task completion probability system from FIG. 4 according to various aspects of the present disclosure.

FIG. 5 is a flow diagram of an exemplary method of initiating the training (operation 408) in the method of training the task completion probability system from FIG. 4 according to various aspects of the present disclosure. In one embodiment, the processor causes the task completion probability system 20 to perform the method in FIG. 7.

At operation 501, the processor receives configuration values. The processor can receive the configuration values from the configuration table 31 of the database 23. The configuration values can be inputs customized by the organization associated with the customer service server system 2. The configuration values are used to compute success values (e.g., $Success_{Total}$) associated with each of the tasks. For example, configuration values include, for each task, average handle times (e.g., $AHT_{Task}$), the weight associated with the successful completion of the task (e.g., $Weight_{Task}$), the weight associated with the handling time of the task (e.g., $Weight_{HT}$), the weight associated with a call survey score (e.g., $Weight_{CallSurvey}$), etc. Using the weights, the organization can choose to emphasize rewarding: good call survey scores, speedy handle time, and/or a successful transaction.

At operation 502, the processor receives the call recording that is a recording of the communication session between the caller and the agent (e.g., through client devices 11, 12). At operation 503, the processor determines if a call survey is available. At the end of a communication session between the caller and the agent, the caller is provided with the option to respond to a call survey during which the caller can rate his satisfaction with the communication session, the agent's handling of his requests or questions, etc. If the caller has opted to provide a response to the call survey, at operation 503, the processor determines that the call survey is available. At operation 504, the processor calculates the normalized call survey score. The normalized call survey score can be a score between −1 and 1. Values under 0 are associated with unfavorable results whereas values over 0 are associated with favorable results. If, at operation 503, the processor determines that the call survey is not available, at operation 505, the processor sets the normalized call survey score to neutral (e.g., 0).

At operation 506, the processor receives the call log associated with the call recording. The call log can include, for example, a listing of each task involved in the call recording, the length of time it took to process each task (e.g., handle time), identified members during the call recording, and whether the tasks were successfully completed.

At operation 507, the processor determines for each task whether a member is identified in the call log. If a member is identified, at operation 508, the processor obtains the member context associated with the member that is identified. The member context can be for example, the initial context data such as a website login information, an automatic number identifier (AIN), and telephone number and member account information such as name, address, employer, medication, insurance information, preferred pharmacy, and information on member's spouse or dependents.

At operation 509, for each task, the processor calculates the criticality value based on the member context. The criticality value indicates a level of criticality associated with the task based on the member context. In one embodiment, the processor causes the criticality system 40 to perform the operation 509 to calculate the criticality value. The criticality value can be a value within a range (e.g., 0 to 1) from low to high criticality levels.

At operation 510, if a member is not identified at operation 507, the processor sets the criticality value to indicate a low criticality level (e.g., 0). At operation 511, the processor stores the criticality value associated with the member for each of the tasks in the call log in the criticality table 32 of the database 23.

At operation 512, the processor determines the success value (e.g., $Success_{Total}$) for each task in the call log. For example, the processor can determine the success value (e.g., $Success_{Total}$) for each task based on whether the task was successfully completed (e.g., $Success_{Task}$), the handle time of the task (e.g., $HT_{Task}$), and the normalized call survey score received for the call during which the task was handled (e.g., $NormalizedScore_{CallSurvey}$). The success value (e.g., $Success_{Total}$) can also be based on the weight associated with the successful completion of the task (e.g., $Weight_{Task}$), the weight associated with the handling time of the task (e.g., $Weight_{HT}$), and the weight associated with a call survey score (e.g., $Weight_{CallSurvey}$). The weights can be used by an organization using the present method(s) to more heavily emphasize the contribution of some inputs to computing the success value. While the inputs may contribute equally to the final result, some inputs are adjusted using the weights to contribute more than other weights. For example, the processor can generate the success value (e.g., $Success_{Total}$) using the following equation:

$$Success_{Total} = (Weight_{Task} * Success_{Task}) + \left(Weight_{HT} * \left(\frac{AHT_{Task} - HT_{Task}}{AHT_{Task}}\right)\right) + (Weight_{CallSurvey} * NormalizedScore_{CallSurvey})$$

At operation 513, the processor stores the success value (e.g., $Success_{Total}$) for each task in the success table 33 of the database 23.

Figure 6:
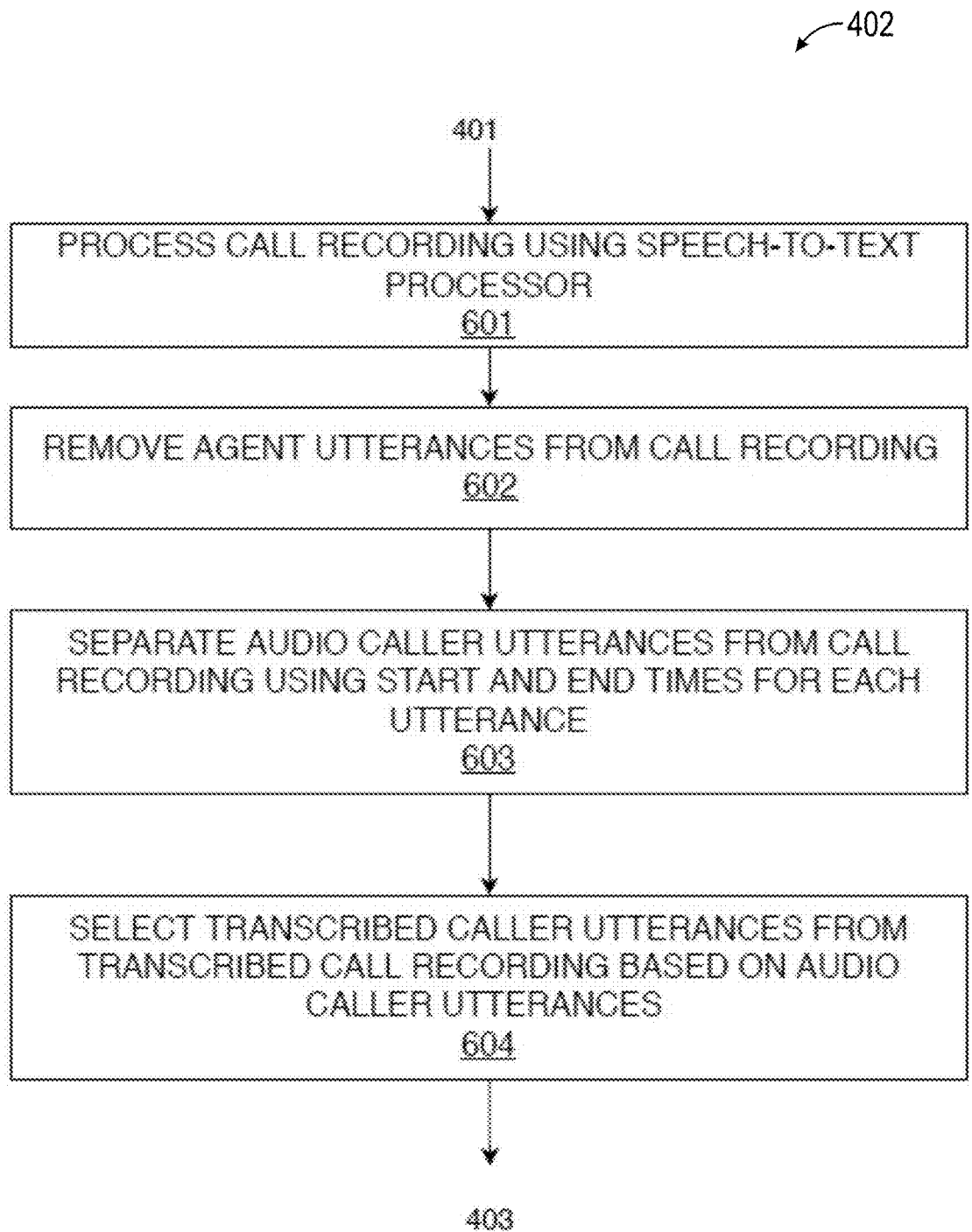
FIG. 6 is a flow diagram of an exemplary method of processing the call recording to generate caller utterances including audio and transcribed caller utterances (operation 402) in the method of training the task completion probability system from FIG. 4 according to various aspects of the present disclosure.

FIG. 6 is a flow diagram of an exemplary method of processing the call recording to generate caller utterances including audio utterances and transcribed caller utterances (operation 402) in the method of training the task completion probability system from FIG. 4 according to various aspects of the present disclosure. In one embodiment, the processor causes the speech-to-text processor that is included in the task completion probability system 20 to perform the method in FIG. 6. In an example embodiment, the processor segments the audio file into individual utterances by the caller, e.g., the user.

At operation 601, the processor processes the call recording using the speech-to-text processor. The processing of the call recording can include transcribing the call recording into a transcribed call recording, identifying separate parties in the call recording and generating start and end times for each utterance included in the call recording. The processing of the call recording can include identifying separate parties in the call recording and generating start and end times for each utterance included in the call recording. The separate parties in the call recording include, for example, the caller and the agent.

At operation 602, the processor removes agent utterances from the utterances included in the call recording to create a caller only audio file.

At operation 603, the processor separates the audio caller utterances from the call recording using the start and end times for each utterance included in the call recording or the caller only audio file.

At operation 604, the processor selects the transcribed caller utterances from the transcribed call recording based on the audio caller utterances. The processor can also select the audio caller utterances from the caller only audio file based on the audio caller utterances. Each utterance can be an individual string.

Figure 7:
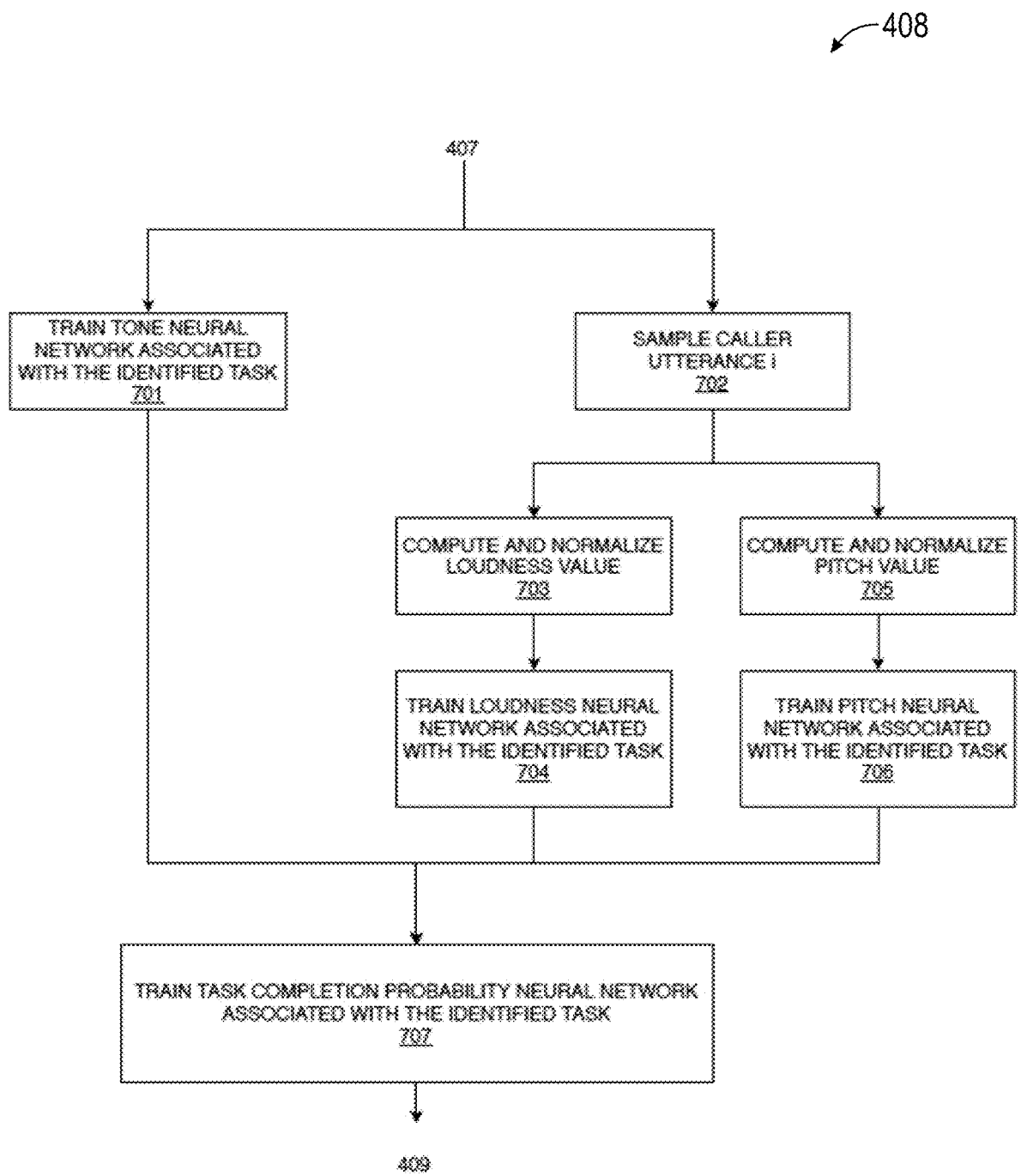
FIG. 7 is a flow diagram of an exemplary method of training the neural networks associated with the identified task (operation 408) in the method of training the task completion probability system from FIG. 4 according to various aspects of the present disclosure.

FIG. 7 is a flow diagram of an exemplary method of training the neural networks associated with the identified task (operation 408 with input from operation 407 and outputs to operation 409) in the method of training the task completion probability system from FIG. 4 according to various aspects of the present disclosure. In one embodiment, the processor causes the task completion probability system 20 to perform the method in FIG. 7.

At operation 701, the processor trains the tone neural network associated with the identified task. The processor trains the tone neural network using the transcribed caller utterance i and the success value (e.g., $Success_{Total}$) as the desired output. In one embodiment, the processor trains the tone neural network using the audio caller utterance i. The tone neural network can be a tone LSTM neural network that is trained using the words uttered by the caller in the call recording.

At operation 702, the processor samples the caller utterance i, over a time period, e.g., periodically. In one embodiment, the processor takes periodic samples of a file of the audio caller utterance i. For example, a periodic sample of the wave file can be 10 samples every 1 second (10 Hz). The sample may be greater than 10 Hz. The audio file can be a bit stream file, pulse-code modulation (PCM) file, wave file, MPEG, etc. In another embodiment, the processor samples the caller utterance i, at an asymmetrical interval over a time period.

At operation 703, for each sample (e.g., audio sample), the processor computes the loudness value in decibels (db) and normalizes the loudness value. The normalized loudness value can be a value within a range (e.g., 0 to 1) that indicates the loudness level of the sample. For example, the loudness value of 0 can be the quietest loudness level that member-related client device 12 or the agent client device can register 11 and the loudness value of 1 can be the highest loudness level that member-related client device 12 or the agent client device can register 11.

At operation 704, the processor trains the loudness neural network associated with the identified task. The loudness neural network can be a LSTM neural network that is trained using the normalized loudness values for each sample and the success value (e.g., $Success_{Total}$) as the desired output.

At operation 705, for each sample, the processor computes the pitch value in hertz (Hz) and normalizes the pitch value. In an example embodiment, the pitch of the audio sample or audio string is the frequency of oscillation of the audio signal over a period of time, e.g., cycles per second (Hz). The normalized pitch value can be a value within a range (e.g., 0 to 1) that indicates the pitch level of the sample. In one embodiment, the normalized pitch value is obtained using the following equation:

$$Pitch_{Normalized} = (Pitch_{Value} - 80)/400$$

Accordingly, the normalized pitch value ($Pitch_{Normalized}$) is based on the pitch value ($Pitch_{Value}$), the maximum pitch value (400 Hz) and the minimum pitch value (80 Hz).

At operation 706, the processor trains the pitch neural network associated with the identified task. The pitch neural network can be a LSTM neural network that is trained using the normalized pitch values for each sample and the success value (e.g., $Success_{Total}$) as the desired output.

At operation 707, the processor trains the task completion probability neural network associated with the identified task. The task completion probability neural network can be a Convolutional Neural Network (CNN) that is trained using any combination of: the result of the tone neural network, the result of the loudness neural network, the result of the pitch neural network, the relationship data and the criticality value. In one embodiment, the processor trains the task completion probability neural network using the success value for the result of the tone neural network, the loudness neural network, and the pitch neural network. The task completion probability neural network can output a value that is within a range (e.g., 0 to 1). For example, a value being closer to 1 indicates that the identified task is most likely to be successfully completed while a value being closer to 0 indicates that the identified task is not likely to be successfully completed.

Figure 8:
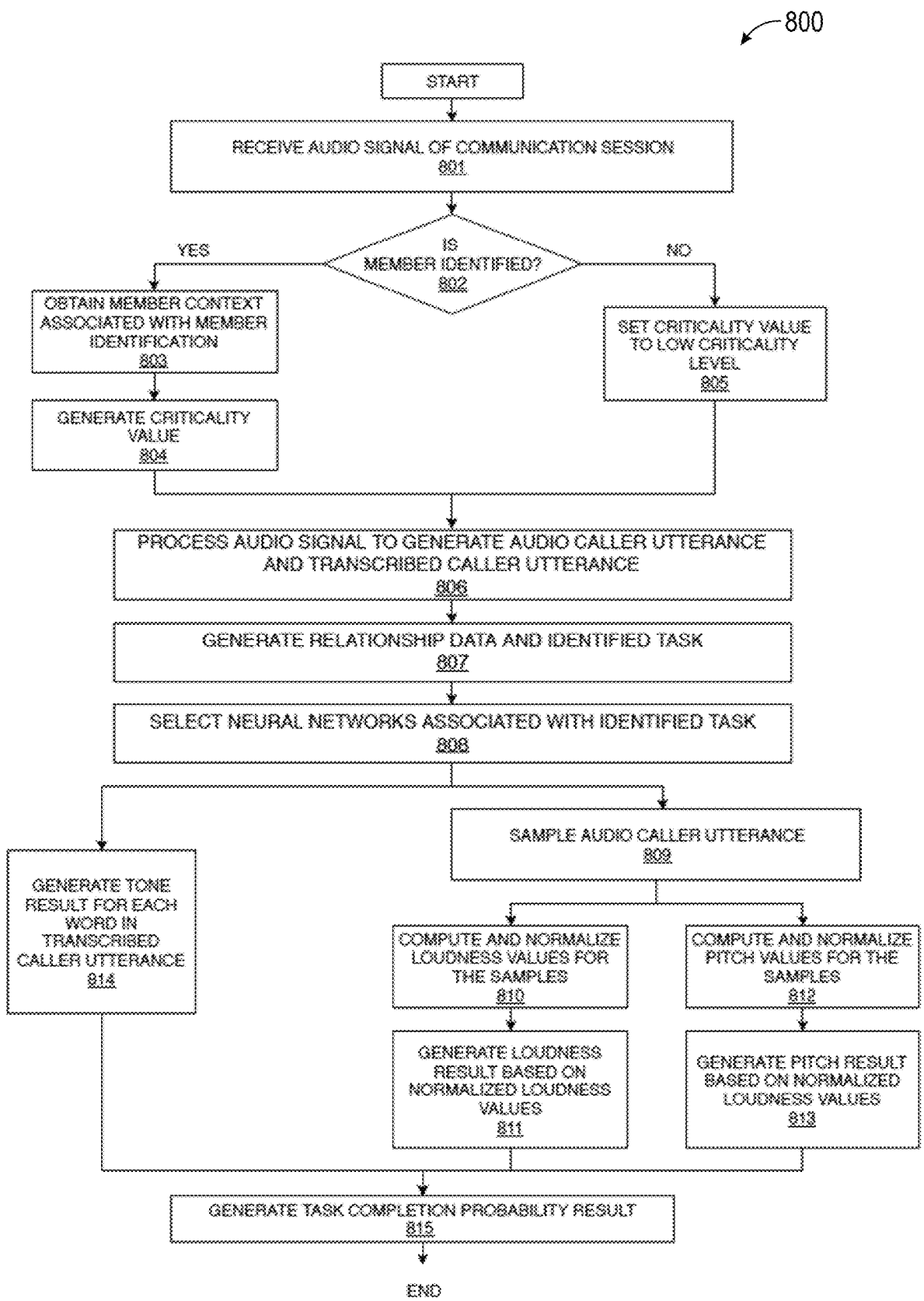
FIG. 8 is a flow diagram of an exemplary method of determining a task completion probability based on speech analysis according to various aspects of the disclosure.

Once the task completion probability system 20 is trained, the task completion probability system 20 can be used to determine the likelihood that a task will be completed successfully based on the content of the communication between the caller and the agent. FIG. 8 is a flow diagram of an exemplary method of determining a task completion probability based on speech analysis according to various aspects of the disclosure. In one embodiment, the processor causes the task completion probability system 20 to perform the method in FIG. 8.

The method 800 starts, at operation 801, with the processor receiving an audio signal of a communication session between a member-related client device 12 and an agent client device 11. The caller is associated with the member-related client device 12. A human agent or an automated agent can be associated with the agent client device 11. The communication session can be an interactive voice response (IVR) or a voice call.

At operation 802, the processor determines whether a member identification is associated with the audio signal (e.g., from the member-related client device 12). The member identification can be, for example, the member's name, account number, telephone number, etc. When the member identification is associated with the audio signal, at operation 803, the processor obtains a member context associated with the member identification. Initial context data can include, for example, website login information, automatic number identifier, telephone number. Initial context data can also include member account information such as name, address, employer, medication, insurance information, preferred pharmacy, and information on member's spouse or dependents.

At operation 804, the processor computes a criticality value that indicates a level of criticality associated with the communication session based on the member context. The criticality value may indicate a low or a high level of criticality. The criticality value can be a binary value (e.g., low or high) or can be a range of values. The processor can cause the criticality system 40 in FIG. 1 to compute the criticality value. When there is no member identification associated with the audio signal, at operation 805, the processor sets the criticality value to indicate a low criticality.

At operation 806, the processor processes the audio signal to generate an audio caller utterance and a transcribed caller utterance. In one embodiment, the processor processes the audio signal using the speech-to-text engine to transcribe the audio signal into a transcribed audio signal, to identify separate parties in the audio signal, and to provide start and end times for each of the utterances included in the audio signal. The separate parties in the audio signal can include, for example, the caller and an agent. To process the audio signal, the processor can also remove agent utterances from the utterances included in the audio signal and separate the audio caller utterance from the audio signal using the start and end times for each of the utterances. The processor can also select the transcribed caller utterance from the transcribed audio signal based on the audio caller utterance.

At operation 807, the processor generates an identified task and the relationship data based on the transcribed caller utterance. The processor can cause the task determination system 30 in FIG. 1 to generate the identified task and the relationship determination system 10 in FIG. 1 to compute the relationship data. The identified task is the task that the caller is wanting to complete during the communication session. The relationship data includes at least one potential relationship between the caller and a patient that is the subject of the transcribed caller utterance. When the caller is communicating with the agent on behalf of himself, the processor can generate the relationship data that includes "self." When the caller is communicating with the agent on behalf of another person (e.g., a patient), the relationship data indicates the relationship between the caller and the patient in order further facilitate in assisting the member. For example, the relationship types include a parent-child relationship in which the caller is a parent and the patient is the caller's child (either the parent or the child can be the member); child-parent relationship in which the caller is a caretaker child and the patient is the caller's parent and member; spousal relationship in which the caller and the patient are spouses; and professional caregiver relationship in which the caller is a professional caregiver for the patient (member). In an example embodiment, the caller is a medical professional calling on behalf of the patient, who is the member.

At operation 808, the processor selects the neural networks associated with the identified task. In one embodiment, the neural networks in the task completion probability system 20 include loudness neural networks, pitch neural networks, tone neural networks, and task completion probability neural networks. The neural networks associated with the identified task can includes a loudness neural network associated with the identified task, a pitch neural network associated with the identified task, a tone neural network associated with the identified task, and a task completion probability neural network associated with the identified task.

At operation 809, the processor samples the audio caller utterance to generate samples of the audio caller utterance. The samples can be periodic. In one embodiment, the processor takes periodic samples of an audio file (e.g., a wave file) of the audio caller utterance. For example, a periodic sample of the audio file can be 10 samples every 1 second. The sampling rate may be changed based on accuracy of the results from the neural networks or based on data demands of the neural networks.

At operation 810, using the selected loudness neural network that is associated with the identified task, the processor computes loudness values for the samples and normalizes the loudness values to obtain normalized loudness values.

At operation 811, the processor generates the loudness result based on the normalized loudness values. The loudness result indicates the likelihood that the identified task will be completed successfully based on the loudness of the transcribed caller utterance. The selected loudness neural network can be an LSTM neural network.

In one embodiment, the loudness LSTM neural network processes the samples of loudness of the audio caller utterance at an input layer, an LSTM layer and a Sigmoid layer. Each of the samples of loudness are numerical values that are passed to a subsequent layer for processing. For example, the LSTM layer generates a value for each sample but the value generated for the first sample is carried over to the analysis of the second sample. The LSTM layer creates a semantic understanding of the loudness of the audio caller utterance given that there is a memory of the analysis of each sample that is carried over. This allows the neural network to assess a whole audio caller utterance more accurately by virtue of having context. The Sigmoid layer is the final layer that receives the samples for processing and outputs the loudness result. In an example embodiment, the neural networks can include a Gated Recurrent Unit (GRU) neural network.

The loudness result that are generated using the neural networks can be a value within a range (e.g., 0 to 1). For example, the loudness result of 0 indicates a lower likelihood of the loudness being associated with a successful completion of the identified task and the loudness result of 1 indicates a higher likelihood of the loudness being associated with a successful completion of the identified task.

At operation 812, using the selected pitch neural network that is associated with the identified task, the processor computes pitch values for the samples and normalizes the pitch values to obtain normalized pitch values.

At operation 813, the processor generates the pitch result based on the normalized pitch values. The pitch result indicates the likelihood that the identified task will be completed successfully based on the pitch of the transcribed caller utterance. The selected pitch neural network can be an LSTM neural network.

In one embodiment, the pitch LSTM neural network processes the samples of pitch of the audio caller utterance at an input layer, an LSTM layer and a Sigmoid layer. Each of the samples of pitch are numerical values that are passed to a subsequent layer for processing. For example, the LSTM layer generates a value for each sample but the value generated for the first sample is carried over to the analysis of the second sample. The LSTM layer creates a semantic understanding of the pitch of the audio caller utterance given that there is a memory of the analysis of each sample that is carried over. This allows the neural network to assess a whole audio caller utterance more accurately by virtue of having context. The Sigmoid layer is the final layer that receives the samples for processing and outputs the pitch result.

The pitch results that are generated using the neural networks can be a value within a range (e.g., 0 to 1). For example, the pitch result of 0 indicates a lower likelihood of the pitch being associated with a successful completion of the identified task and the pitch result of 1 indicates a higher likelihood of the pitch being associated with a successful completion of the identified task.

At operation 814, using the selected tone neural network that is associated with the identified task, the processor generates a tone result for each word in the transcribed caller utterance. The tone result indicates the likelihood that the identified task will be completed successfully based on the tone of the transcribed caller utterance. The tone can refer to the tone of the words that are chosen by the caller. For example, a caller that is a parent of a young of children may choose not to use swear words to convey that they are upset, but rather rely on pitch and loudness in their voice. In another example, a caregiver caller may rely on having an even voice in pitch and loudness but convey extreme displeasure in the words chosen. In one embodiment, the tone LSTM neural network processes the transcribed caller utterance at an input layer, an embed layer, an LSTM layer and a Sigmoid layer. The input layer receives the transcribed caller utterance and separate the transcribed caller utterance into separate words. Each word in the transcribed caller utterance is passed to a subsequent layer for processing. For example, the embed layer receives and translates each word into numerical values. The LSTM layer generates a value for each word but the value generated for the first word is carried over to the analysis of the second word. The LSTM layer creates a semantic understanding of the tone of the transcribed caller utterance given that there is a memory of the analysis of each word that is carried over. This allows the neural network to assess a whole transcribed caller utterance more accurately by virtue of having context. The Sigmoid layer is the final layer that receives the words for processing and outputs the tone result.

The tone result that is generated using the selected tone LSTM neural network can be a value within a range (e.g., 0 to 1). For example, a tone result of 0 indicates a lower likelihood of the tone being associated with a successful completion of the identified task and a tone result of 1 indicates a higher likelihood of the tone being associated with a successful completion of the identified task.

At operation 815, using the selected task completion probability neural network associated with the identified task, the processor generates a task completion probability result based on the loudness result, the pitch result, the tone result, the relationship value, the criticality value or any combination thereof. The task completion probability result indicates the likelihood of the identified task being successfully completed based on the speech analysis.

The selected task completion probability neural network can be a convolutional neural network (CNN). In one embodiment, the task completion probability CNN processes the loudness result, the pitch result, the tone result, the relationship value, the criticality value, or any combination thereof at an input layer, an embed layer, at least one hidden layer, and a Sigmoid layer. The embed layer may provide a memory of the results and/or values received such that there is a memory of the analysis of each result and/or value that is carried over. The Sigmoid layer is the final layer that receives results and/or values and outputs the task completion probability result.

The task completion probability result that is generated using the selected task completion probability CNN can be a value within a range (e.g., 0 to 1). In one example, a task completion probability result of 0 indicates a lower likelihood of the successful completion of the identified task and the task completion probability result of 1 indicates a higher likelihood of a successful completion of the identified task.

Figure 9:
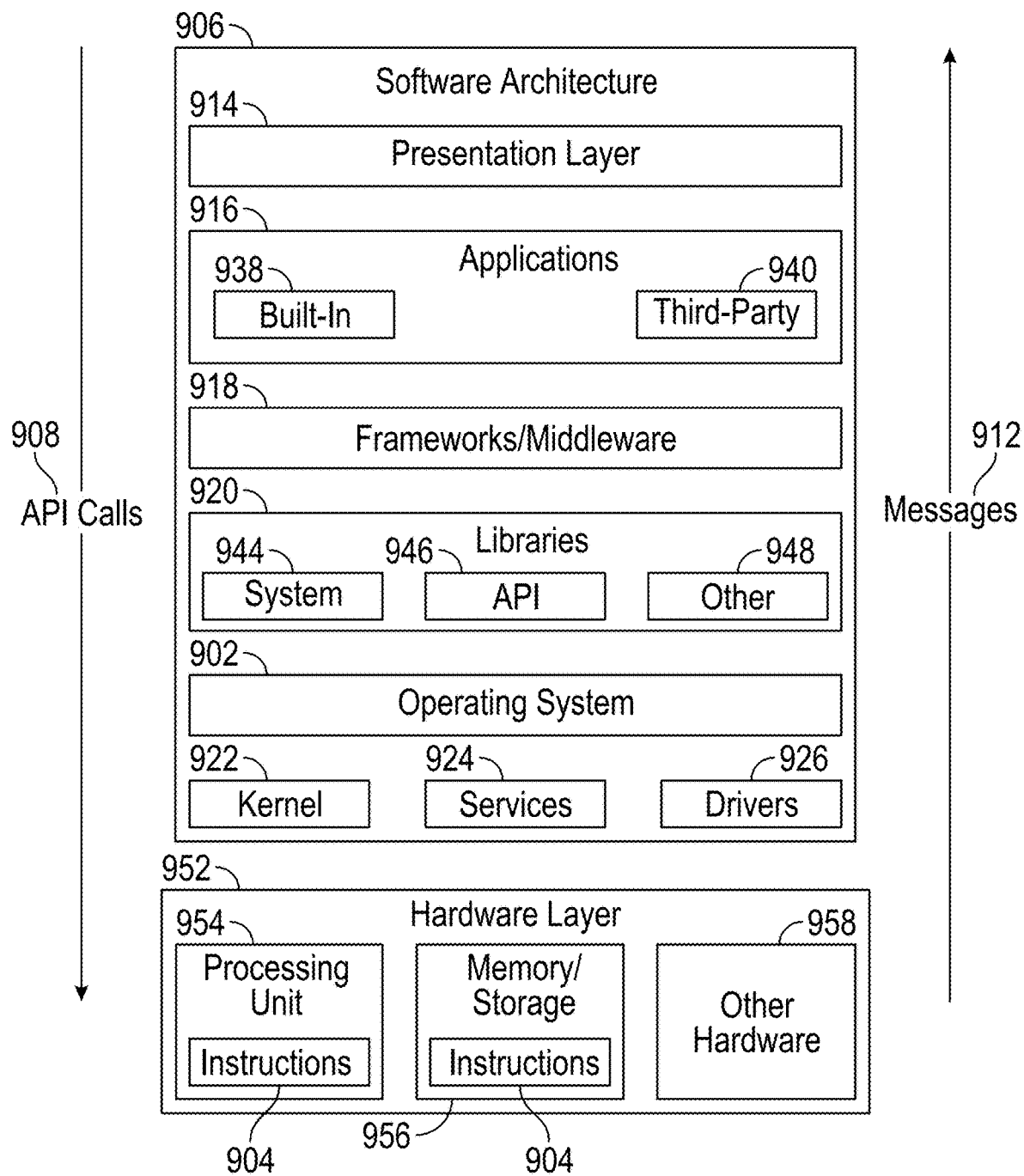
FIG. 9 is a block diagram illustrating a representative software architecture, which may be used in conjunction with various hardware architectures herein described.

FIG. 9 is a block diagram illustrating an exemplary software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory or storage modules memory/storage 956, which also have executable instructions 904. The hardware layer 952 may also comprise other hardware 958.

As used herein, the term "component" may refer to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a processor or other programmable processor. Once configured by such software, hardware components become specific machines (or specific components of a machine) uniquely tailored to perform the configured functions and are no longer processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit, circuitry, or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously. The processor as used herein may be a hardware component, which is in at least one of the devices, systems, servers and the like. The processor may include multiple cores and may be spread across multiple devices. The processor includes circuitry to execute instructions relating to the methods and structures described herein for determining relationships and outputting relationship data that is used by various device and their users.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a processor configured by software to become a special-purpose processor, the processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 or other components within the layers may invoke application programming interface (API) API calls 908 through the software stack and receive messages 912 in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 or other components or layers. The libraries 920 provide functionality that allows other software components to perform tasks in an easier fashion than to interface directly with the underlying operating system 902 functionality (e.g., kernel 922, services 924 or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 or other software components/modules, some of which may be specific to a particular operating system 902 or platform.

The applications 916 include built-in applications 938 or third-party applications 940. The third-party applications 940 may invoke the API calls 908 provided by the operating system 902 to facilitate functionality described herein.

The applications 916 may use built in operating system functions (e.g., kernel 922, services 924 or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
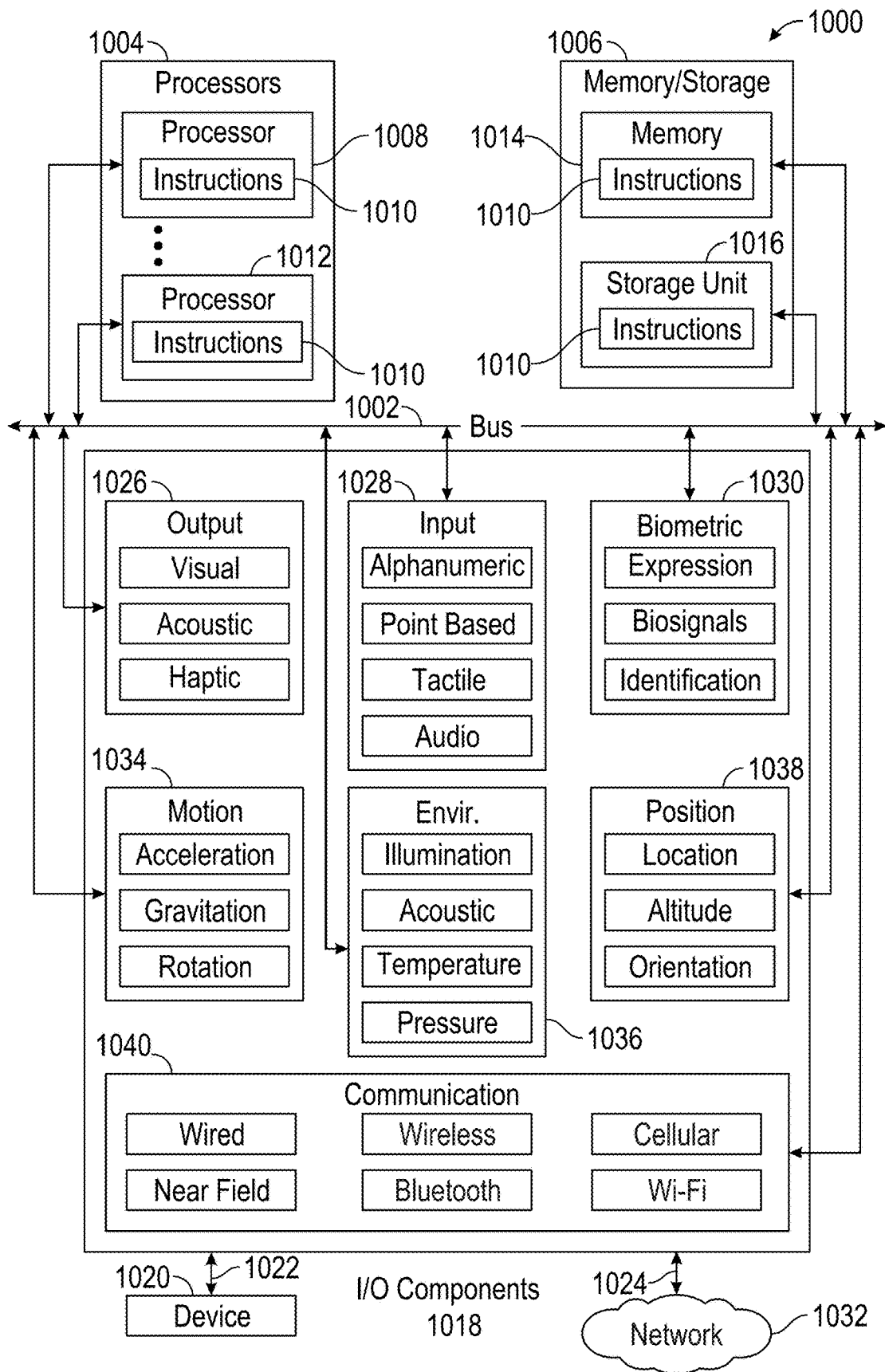
FIG. 10 is a block diagram illustrating components of a machine, according to some exemplary embodiments, able to read instructions from a machine-readable medium (e.g., a machine-readable storage medium) and perform any one or more of the methodologies discussed herein.

FIG. 10 is a block diagram illustrating components (also referred to herein as "modules") of a machine 1000, according to some exemplary embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a laptop computer, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

As used herein, the term "machine-readable medium," "computer-readable medium," or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 1018 may include a wide variety of components to provide a user interface for receiving input, providing output, producing output, transmitting information, exchanging information, capturing measurements, and so on. The specific I/O components 1018 that are included in the user interface of a particular machine 1000 will depend on the type of machine. It will be appreciated that the I/O components 1018 may include many other components that are not shown in FIG. 10. The I/O components 1018 are grouped according to functionality merely for simplifying the following discussion and the grouping is in no way limiting. In various exemplary embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like. The input components 1028 may also include one or more image-capturing devices, such as a digital camera for generating digital images or video.

In further exemplary embodiments, the I/O components 1018 may include biometric components 1030, motion components 1034, environmental environment components 1036, or position components 1038, as well as a wide array of other components. One or more of such components (or portions thereof) may collectively be referred to herein as a "sensor component" or "sensor" for collecting various data related to the machine 1000, the environment of the machine 1000, a user of the machine 1000, or a combinations thereof.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)). Moreover, the communication components 1040 may detect identifiers or include components operable to detect identifiers.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present disclosure as represented by the appended claims.

The specification and drawings are, accordingly, to be regarded in an illustrative rather than a restrictive sense.

What is claimed is:

1. A method, comprising:
receiving an audio signal of a communication session between a member-related client device and an agent client device, wherein a caller is associated with the member-related client device;
processing the audio signal to generate an audio caller utterance and a transcribed caller utterance;
generating an identified task based on the transcribed caller utterance;
generating, using a tone neural network associated with the identified task, a tone result for a plurality of words in the transcribed caller utterance; and
generating, using a task completion probability neural network associated with the identified task, a task completion probability result based on the identified task and the tone result.

2. The method of claim 1, further comprising:
determining whether a member identification is associated with the audio signal; and
when the member identification is associated with the audio signal,
obtaining a member context associated with the member identification;
computing a criticality value that indicates a level of criticality associated with the communication session based on the member context; and
generating the task completion probability result based on the criticality value, the identified task, and the tone result.

3. The method of claim 2, further comprising:
determining whether a member identification is associated with the audio signal; and
when there is no member identification associated with the audio signal, setting the criticality value to indicate a low criticality; and
generating the task completion probability result based on the criticality value, the identified task, and the tone result.

4. The method of claim 1, further comprising:
sampling the audio caller utterance to generate a plurality of samples of the audio caller utterance;
generating a loudness result based on loudness values of the plurality of samples associated with the identified task; and
generating the task completion probability result based on the loudness result, the identified task, and the tone result.

5. The method of claim 4, wherein generating the loudness result further comprises:
computing the loudness values for the plurality of samples;
normalizing the loudness values to obtain normalized loudness values for the plurality of samples; and
generating the loudness result based on the normalized loudness values for the plurality of samples.

6. The method of claim 1, further comprising:
sampling the audio caller utterance to generate a plurality of samples of the audio caller utterance;
generating a pitch result based on pitch values of the plurality of samples associated with the identified task; and
generating task completion probability result based on the pitch result, the identified task, and the tone result.

7. The method of claim 6, wherein generating the pitch result further comprises:
computing the pitch values for the plurality of samples;
normalizing the pitch values to obtain normalized pitch values for the plurality of samples; and
generating the pitch result based on the normalized pitch values for the plurality of samples.

8. A system, comprising:
a processor; and
a memory component having instructions stored thereon, which, when executed by the processor, cause the processor to perform operations comprising:
receiving an audio signal of a communication session between a member-related client device and an agent client device, wherein a caller is associated with the member-related client device;
processing the audio signal to generate an audio caller utterance and a transcribed caller utterance;
generating an identified task based on the transcribed caller utterance;
generating, using a first tone neural network associated with the identified task, a tone result for a plurality of words in the transcribed caller utterance; and
generating, using a first task completion probability neural network associated with the identified task, a task completion probability result based on the identified task and the tone result.

9. The system of claim 8, wherein the operations further comprise:
generating relationship data based on the transcribed caller utterance, the relationship data including at least a potential relationship between the caller and a patient indicated by the transcribed caller utterance; and
generating the task completion probability result based on the relationship data, the identified task, and the tone result.

10. The system of claim 8, wherein processing the audio signal to generate the audio caller utterance and the transcribed caller utterance further comprises:
processing the audio signal using a speech-to-text engine,
to transcribe the audio signal into a transcribed audio signal,
to identify separate parties in the audio signal, wherein the separate parties include the caller and an agent, and
to provide start and end times for each of a plurality of utterances included in the audio signal;
removing agent utterances from the plurality of utterances included in the audio signal;
separating the audio caller utterance from the audio signal using the start and end times for each of a plurality of utterances; and
selecting the transcribed caller utterance from the transcribed audio signal based on the audio caller utterance.

11. The system of claim 8, further comprising:
a plurality of neural networks including a plurality of tone neural networks and a plurality of task completion probability neural networks, wherein the plurality of neural networks are associated with a plurality of tasks, respectively, wherein the plurality of tone neural networks comprises the first tone neural network, wherein the plurality of task completion neural networks comprises the first task completion neural network;
wherein the operations further comprise:
generating the tone result using the plurality of tone neural networks, based on the identified task; and generating the task completion probability result using the plurality of task completion probability neural networks, based on the identified task and the tone result.

12. The system of claim 8, wherein the operations further comprise:
sampling the audio caller utterance to generate a plurality of samples of the audio caller utterance;
generating a loudness result based on loudness values of the plurality of samples associated with the identified task;
generating a pitch result based on pitch values of the plurality of samples associated with the identified task; and
generating the task completion probability result based on the loudness result, the pitch result, the identified task, and the tone result.

13. The system of claim 12, wherein generating the loudness result further comprises:
computing the loudness values for the plurality of samples;
normalizing the loudness values to obtain normalized loudness values for the plurality of samples; and
generating the loudness result based on the normalized loudness values for the plurality of samples.

14. The system of claim 12, wherein generating the pitch result further comprises:
computing the pitch values for the plurality of samples;
normalizing the pitch values to obtain normalized pitch values for the plurality of samples; and
generating the pitch result based on the normalized pitch values for the plurality of samples.

15. A method, comprising:
obtaining an array data structure that is a transcribed utterance or an electronic message from a communication session established between a member-related client device and an agent client device;
generating an identified task based on the transcribed utterance or the electronic message;
generating, using a tone neural network associated with the identified task, a tone result for a plurality of words in the array data structure, wherein the tone result indicates a first likelihood of successful completion of the identified task based on a tone of words used by a caller via the member-related client device during the communication session; and
generating, using a task completion probability neural network associated with the identified task, a task completion probability result based on at least the identified task and the tone result.

16. The method of claim 15, further comprising:
selecting the tone neural network associated with the identified task, wherein the tone neural network comprises a Long-Short Term Memory (LSTM) neural network; and
generating the tone result for the plurality of words in the transcribed utterance, using the tone neural network comprising the LSTM neural network.

17. The method of claim 15, further comprising:
selecting the task completion probability neural network associated with the identified task, wherein the task completion probability neural network comprises a convolutional neural network (CNN); and
generating the task completion probability result using the first task completion probability neural network comprising the CNN.

18. The method of claim 15, further comprising:
determining that member identification is associated with the member-related client device, wherein the member identification includes one or more of a member name, an account number, or a telephone number;
obtaining member context data associated with the member identification, wherein the member context data includes one or more of website login information, an automatic number identifier, a telephone number, or account information;
computing a criticality value that indicates a level of criticality associated with the communication session based on the member context; and
generating the task completion probability result based on at least the criticality value, the identified task, and the tone result.

19. The method of claim 15, further comprising:
determining that no member identification is associated with the member-related client device, wherein the member identification includes one or more of a member name, an account number, or a telephone number; and
in response to no member identification being associated with the member-related client device,
setting a criticality value to indicate a low criticality; and
generating the task completion probability result based on at least the criticality value, the identified task, and the tone result.

* * * * *